(12) United States Patent
Natanzon et al.

(10) Patent No.: US 8,949,180 B1
(45) Date of Patent: Feb. 3, 2015

(54) REPLICATING KEY-VALUE PAIRS IN A CONTINUOUS DATA PROTECTION SYSTEM

(75) Inventors: Assaf Natanzon, Tel Aviv (IL); Saar Cohen, Mishmeret (IL); Alex Solan, Hertzliya (IL); Jehuda Shemer, Kfar Saba (IL)

(73) Assignee: EMC International Company, Hamilton (BM)

( * ) Notice: Subject to any disclaimer, the term of this patent is extended or adjusted under 35 U.S.C. 154(b) by 337 days.

(21) Appl. No.: 13/535,865

(22) Filed: Jun. 28, 2012

(51) Int. Cl.
*G06F 17/30* (2006.01)
(52) U.S. Cl.
USPC ........... 707/610; 707/620; 707/624; 707/625; 707/637

(58) Field of Classification Search
None
See application file for complete search history.

(56) References Cited

U.S. PATENT DOCUMENTS

2008/0082770 A1* 4/2008 Ahal et al. .................... 711/162
2013/0055248 A1* 2/2013 Sokolinski et al. ............... 718/1

* cited by examiner

*Primary Examiner* — Anh Tai Tran
(74) *Attorney, Agent, or Firm* — Daly, Crowley, Mofford & Durkee, LLP

(57) ABSTRACT

In one aspect, a method to replicate a key-value pair includes intercepting a command to update a key-value pair in a key-value pair database, the key-value database comprising metadata of a virtual volume, sending an updated key-value pair to a data protection appliance, receiving an acknowledgement that the data protection appliance received the updated key-value pair and updating the key-value pair in the key-value database after the acknowledgement is received.

10 Claims, 8 Drawing Sheets

REPLICATING KEY-VALUE PAIRS IN A CONTINUOUS DATA PROTECTION SYSTEM

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method to replicate a key-value pair includes intercepting a command to update a key-value pair in a key-value pair database, the key-value database comprising metadata of a virtual volume, sending an updated key-value pair to a data protection appliance, receiving an acknowledgement that the data protection appliance received the updated key-value pair and updating the key-value pair in the key-value database after the acknowledgement is received.

In another aspect, an article includes a non-transitory machine-readable medium that stores executable instructions. The instructions cause a machine to intercept a command to update a key-value pair in a key-value pair database, the key-value database comprising metadata of a virtual volume, send an updated key-value pair to a data protection appliance, receive an acknowledgement that the data protection appliance received the updated key-value pair and update the key-value pair in the key-value database after the acknowledgement is received.

In a further aspect, an apparatus includes circuitry configured to intercept a command to update a key-value pair in a key-value pair database, the key-value database comprising metadata of a virtual volume, send an updated key-value pair to a data protection appliance, receive an acknowledgement that the data protection appliance received the updated key-value pair and update the key-value pair in the key-value database after the acknowledgement is received.

DETAILED DESCRIPTION

Figure 1:
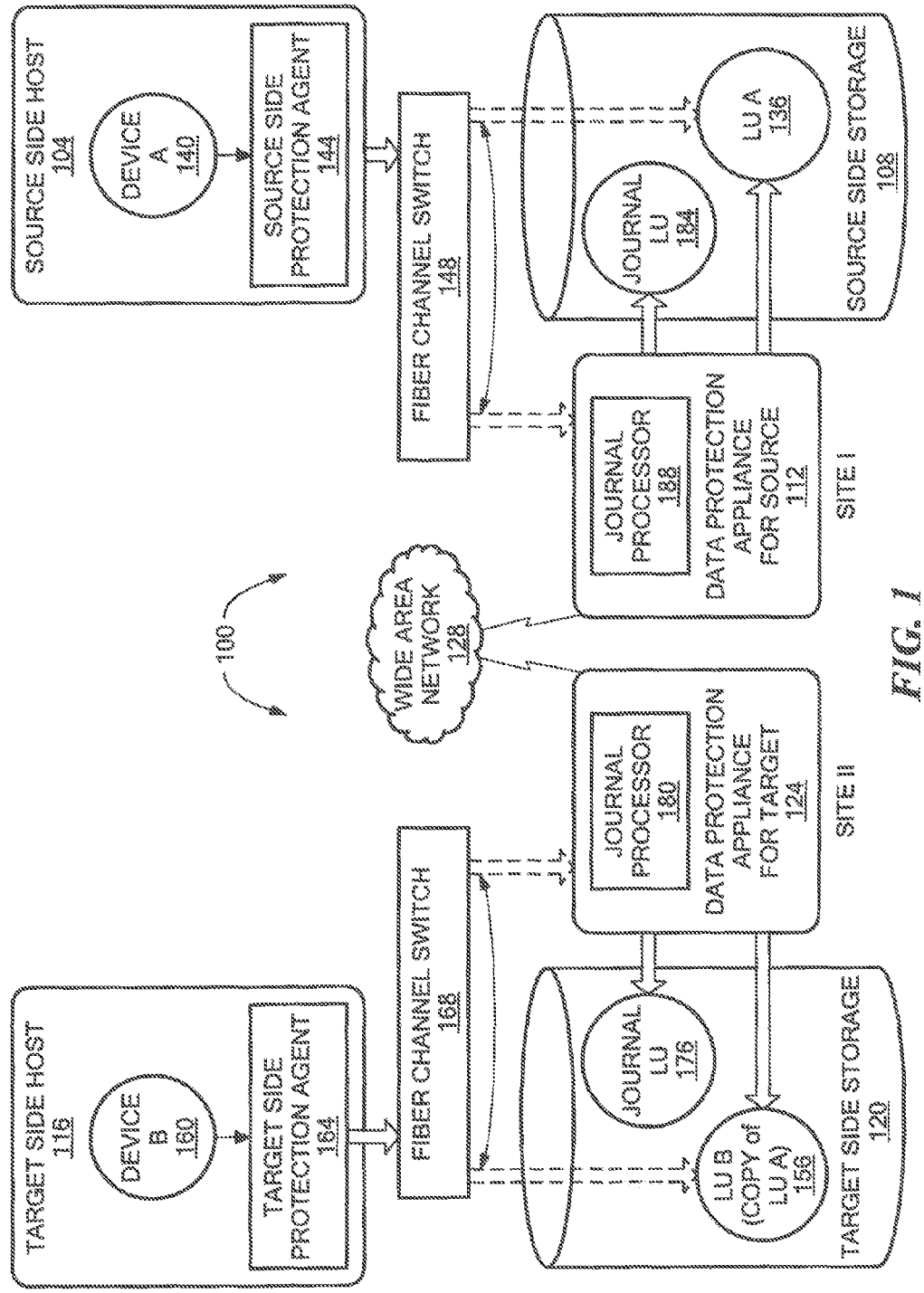
FIG. 1 is a block diagram of an example of a data protection system.

Virtual volumes are a new storage abstraction to store virtual machines (VM). Each virtual volume has a key-value pair database attached to it, which contains metadata information about the virtual volume. Described herein are techniques to replicate virtual volumes with their key-value databases in a continuous data protection environment.

The following definitions may be useful in understanding the specification and claims.

BACKUP SITE—a facility where replicated production site data is stored; the backup site may be located in a remote site or at the same location as the production site;

DATA PROTECTION APPLIANCE (DPA)—a computer or a cluster of computers responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request which may be a read I/O request (read request) or a write I/O request (write request), also referred to as an I/O;

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

SPLITTER ACKNOWLEDGEMENT—an acknowledgement from a DPA to the protection agent that data has been received at the DPA; this may be achieved by SCSI status cmd.

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

VIRTUAL LOGICAL UNIT—a virtual storage entity which is treated as a logical unit by virtual machines;

WAN—a wide area network that connects local networks and enables them to communicate with one another, such as the Internet.

REMOTE ACKNOWLEDGEMENTS—an acknowledgement from remote DPA to the local DPA that data arrived at the remote DPA (either to the appliance or the journal)

A description of journaling and some techniques associated with journaling may be described in the patent titled "METHODS AND APPARATUS FOR OPTIMAL JOURNALING FOR CONTINUOUS DATA REPLICATION" and with U.S. Pat. No. 7,516,287, which is hereby incorporated by reference.

An Example of a Replication System

Referring to FIG. 1, a data protection system 100 includes two sites; Site I, which is a production site, and Site II, which is a backup site. Under normal operation the production site is the source side of system 100, and the backup site is the target side of the system. The backup site is responsible for replicating production site data. Additionally, the backup site enables roll back of Site I data to an earlier pointing time, which may be used in the event of data corruption of a disaster, or alternatively in order to view or to access data from an earlier point in time.

FIG. 1 is an overview of a system for data replication of either physical or virtual logical units. Thus, one of ordinary skill in the art would appreciate that in a virtual environment a hypervisor, in one example, would consume logical units and generate a distributed file system on them such as VMFS creates files in the file system and expose the files as logical units to the virtual machines (each VMDK is seen as a SCSI device by virtual hosts). In another example, the hypervisor consumes a network based file system and exposes files in the NFS as SCSI devices to virtual hosts.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks may be used.

Each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124. As well, the protection agent (splitter) may run on the host, or on the storage, or in the network or at a hypervisor level, and that DPAs are optional and DPA code may run on the storage array too, or the DPA 124 may run as a virtual machine.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

The host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. The logical unit may be a physical logical unit or a virtual logical unit. A logical unit is identified by a unique logical unit number (LUN). Storage system 108 exposes a logical unit 136, designated as LU A, and storage system 120 exposes a logical unit 156, designated as LU B.

LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. Host device 104 identifies LU A and generates a corresponding host device 140, designated as Device A, through which it can access LU A. Similarly, host computer 116 identifies LU B and generates a corresponding device 160, designated as Device B.

In the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein, when acting as a target side DPA, a DPA may also enable roll back of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands or any other protocol.

DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

Host computer 104 and host computer 116 include protection agents 144 and 164, respectively. Protection agents 144 and 164 intercept SCSI commands issued by their respective host computers, via host devices to logical units that are accessible to the host computers. A data protection agent may act on an intercepted SCSI commands issued to a logical unit, in one of the following ways: send the SCSI commands to its intended logical unit; redirect the SCSI command to another logical unit; split the SCSI command by sending it first to the respective DPA; after the DPA returns an acknowledgement, send the SCSI command to its intended logical unit; fail a SCSI command by returning an error return code; and delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. Protection agents communicate with their respective DPAs by sending SCSI commands over fiber channel.

Protection agents 144 and 164 are drivers located in their respective host computers 104 and 116. Alternatively, a protection agent may also be located in a fiber channel switch, or in any other device situated in a data path between a host computer and a storage system or on the storage system itself. In a virtualized environment, the protection agent may run at the hypervisor layer or in a virtual machine providing a virtualization layer.

What follows is a detailed description of system behavior under normal production mode, and under recovery mode.

In production mode DPA 112 acts as a source site DPA for LU A. Thus, protection agent 144 is configured to act as a source side protection agent; i.e., as a splitter for host device A. Specifically, protection agent 144 replicates SCSI I/O write requests. A replicated SCSI I/O write request is sent to DPA 112. After receiving an acknowledgement from DPA 124, protection agent 144 then sends the SCSI I/O write request to LU A. After receiving a second acknowledgement from storage system 108 host computer 104 acknowledges that an I/O command complete.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

Target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 enters write transactions received by DPA 124 from DPA 112 into the journal, by writing them into the journal LU, reads the undo information for the transaction from LU B. updates the journal entries in the journal LU with undo information, applies the journal transactions to LU B, and removes already-applied transactions from the journal.

Figure 2:
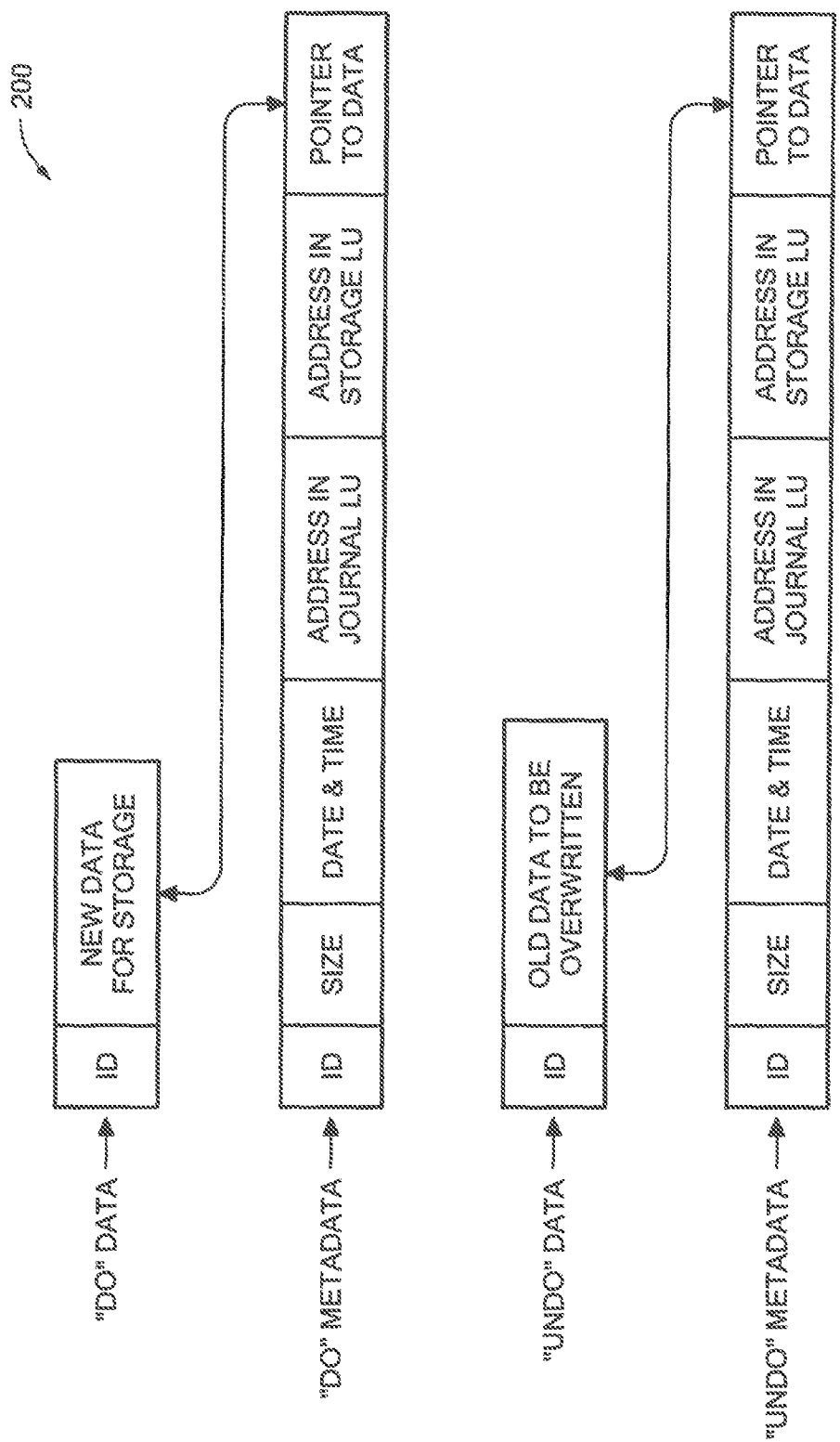
FIG. 2 is an illustration of an example of a journal history of write transactions for a storage system.

Referring to FIG. 2, which is an illustration of a write transaction 200 for a journal. The journal may be used to provide an adaptor for access to storage 120 at the state it was in at any specified point in time. Since the journal contains the "undo" information necessary to roll back storage system 120, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 112; a write size, which is the size of the data block; a location in journal LU 176 where the data is entered; a location in LU B where the data is to be written; and the data itself.

Write transaction 200 is transmitted from source side DPA 112 to target side DPA 124. As shown in FIG. 2, DPA 124 records the write transaction 200 in the journal that includes four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the DO stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the UNDO stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream.

Figure 3:
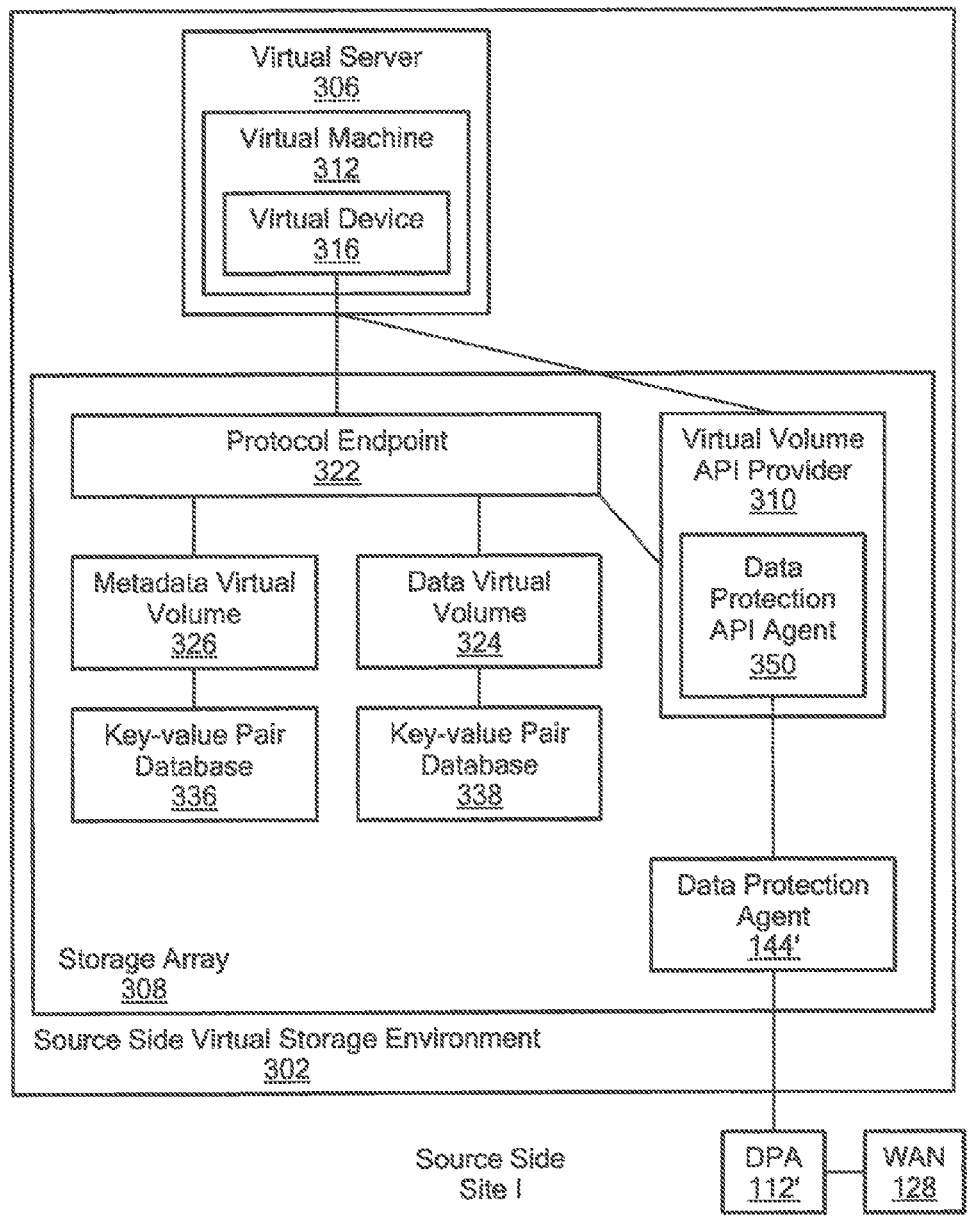
FIG. 3 is a diagram of a source side virtual storage environment.

Referring to FIG. 3, in one example, the source side components in FIG. 1 may be replaced by a source-side virtual storage environment 302. In this configuration, the host 104 is removed and replaced by a virtual machine 312. The DPA 112 is replaced with a DPA 112' which may either run as a virtual or physical machine. In one example, the DPA 112' runs either in the virtual machine 312 or as a set of processes in a storage array 308. The source side data protection agent 144 is removed from the host 104 and replaced by a data protection agent 144' at the storage array 308. In other examples, the data protection agent 144' is placed at a virtual server 106.

In one example, the source side virtual storage environment 302 includes the virtual server 306 and the storage array 308. The virtual server 306 includes the virtual machine 312, which includes a virtual device 316. In one example, the virtual server 306 is a VMWARE® ESX® server.

The storage array 308 includes the data protection agent 144', a virtual volume API (Application Program Interface) provider 310, a protocol endpoint 322, a data virtual volume 324, a metadata virtual volume 326, and a key-value pair database for each virtual volume (e.g., a key-value pair database 336 for the metadata virtual volume 326 and a key-value pair database 338 for the data virtual volume 324). The data virtual volume 324 stores data associated with one virtual disk or virtual disk derivative (e.g., a snapshot).

The virtual volume API provider 310 provides APIs to allow integration and use of components within the source side virtual storage environment 302. For example it would allow a hypervisor (virtual server 306) to provision storage virtual volumes for virtual machines. The virtual volume API provider 310 may run in other locations than the storage array 308 such as on the virtual server 306 or in a virtual machine, which will be a different machine than virtual machine 312, which is an application machine (e.g., when the data protection agent 144' runs in a hypervisor level). In one example, the virtual volume API provider 310 is a VMWARE® vSphere Storage APIs-Storage Awareness (VASA) provider.

The virtual volume API provider 310 includes a data protection API agent 350. The data protection API agent 350 is used to intercept any commands used to update the key-value pair databases 336, 338. The data protection API agent 350 will notify the data protection agent 144' (splitter) or the DPA 112' on any change occurring to the key-value pair databases 336, 338.

In one example, the virtual volumes 324, 326 may be exposed by a virtualization layer such as a virtual volume filter, and in this case the data protection agent 144' runs in the virtualization layer and the virtual volume API provider 310 may run inside the virtualization layer or in a hypervisor.

In one particular example, the data protection agent 144' runs in the hypervisor kernel, and in this case a second virtual volume API provider layer may run outside the storage array 308 intercepting the API commands and sending them to both data the data protection API agent 350, which will run in the second virtual volume API provider and to first virtual volume API provider 310 running inside storage array 308 (in this case, the data protection agent 350 will not run inside the virtual volume API provider 310 but in the layered second virtual volume provider outside the storage array 308).

The key-value pair databases 336, 338 each include information about their respective virtual volume and other metadata information about their respective virtual volume to allow recovery of the system (e.g., to discover which virtual machines are available) in case of a failure.

Normally, key-value pairs from the key-value pair database are not used in a normal operation; but rather, used to salvage virtual machines from shared storage when the virtual server (e.g., the virtual server 312) databases are corrupted. During recovery, a key-match query operation is performed to rediscover "lost" virtual machines and virtual disks (e.g., the virtual machine 316 with both its metadata virtual volume 326 and data virtual volume 324).

In one example, a key-value pair are well-known keys. In particular, the definition of certain keys (and hence the interpretation of their values) are publicly available. In another example, the key-value pairs are VMWARE®-specific keys. In a further example, the key-value pairs are storage vendor specific keys. In some examples, the key-value pairs are encoded as UTF-8; and a maximum length of a key is 64 bytes and a maximum length of a value is 8 KB.

Figure 4:
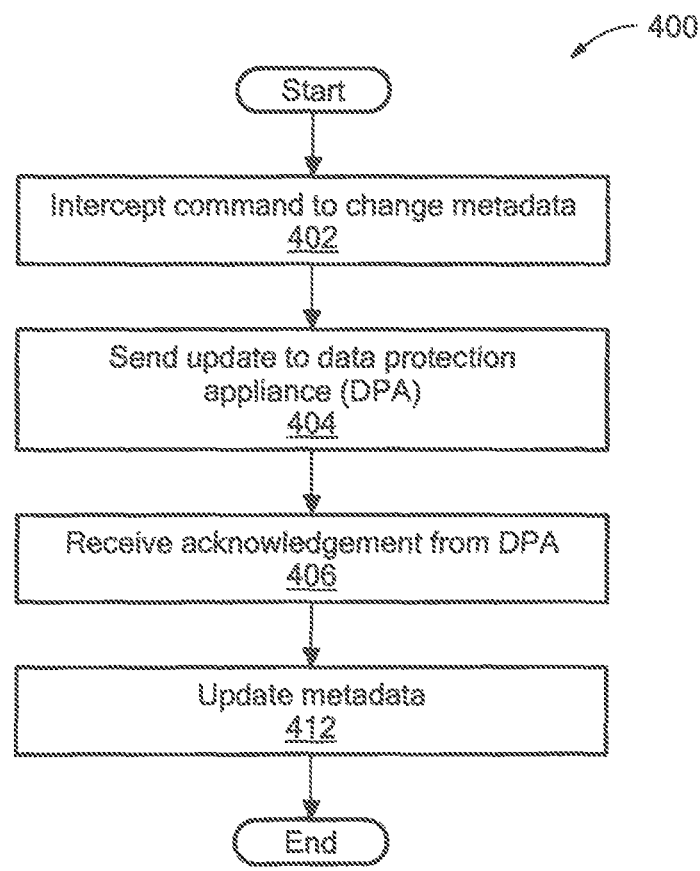
FIG. 4 is a flowchart of an example of a process to update key-value pairs in the key-value pair databases.

As will be shown further with respect to FIG. 4, recording the changes to the key-value pairs allows a user to replicate the key value pairs to a remote storage and also to roll back to earlier points in time to determine what a key value was using the data protection system 100.

The method suggested here is independent of the storage technology and allows replication of the key-value database regardless of the way the database is implemented in the storage array.

In one example, each virtual device is associated with one protocol endpoint and one data virtual volume. In one example, the virtual volumes are VMWARE® virtual volumes. In other example, multiple virtual devices may be associated with the same protocol endpoint.

Referring to FIG. 4, an example of a process to update key/value pairs in the key-value pair databases is a process 400. Process 400 intercepts a command to change metadata (402). For example, the data protection API agent 350 intercepts the one or more keys that are going to be updated. In one example, the command is an API. In one particular example, the API is a UpdateVirtualVolumeMetadata API used by VMWARE®.

Process 400 sends the update to the one or more key-value pairs to the data protection appliance 112' (404). In another example, the data protection API agent 350 sends the command to the data protection agent 144' running in the storage array 308 which in turn sends the information to DPA 112'. In one example, the update is sent to the DPA 112' using a SCSI command or over IP. In other examples, since the virtual volume API provider 310 may run outside the storage array 308, the provider 310 may not have SCSI access to the DPA 112' or maybe even no access at all to the DPA 112'. Thus, the provider 310 must have some access to the storage array 308 and thus the update to the key will be done through the protection agent 144' running inside the storage array 308. In one example, if the update is to delete a key a null sign is used for its value instead of deleting the key.

Process 400 receives acknowledgement that the updated key/value pair was received (406). For example, the data protection agent 350 receives acknowledgement from the DPA 112 that it received the updated keys.

Process 400 updates the key-value pair (412). For example, the data protection API agent 350 allows the update of the key-value pair to occur in the key-value database (e.g., key-value pair database 336 or key-valuepair database 338).

Figure 5:
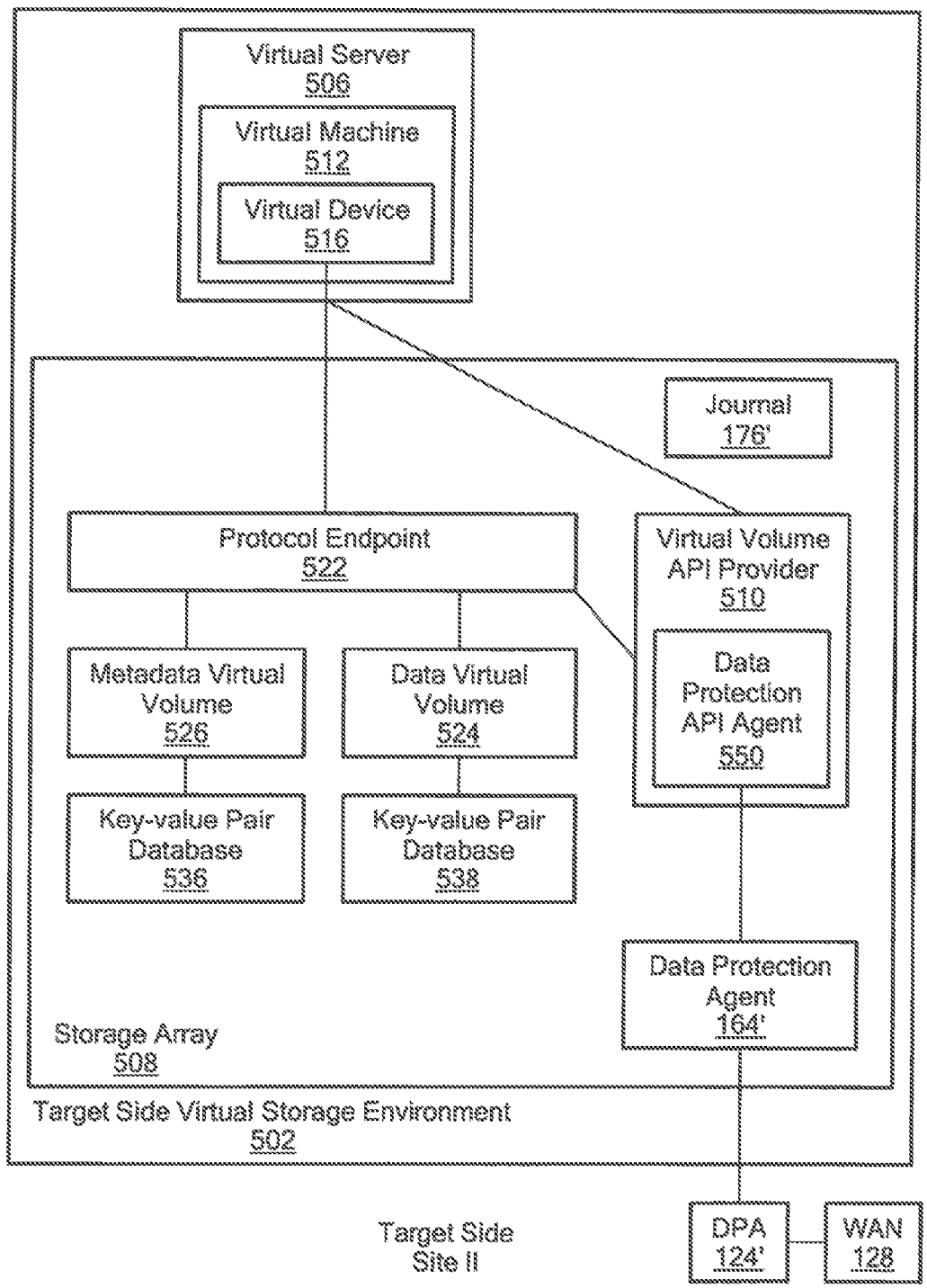
FIG. 5 is a diagram of a target side virtual storage environment.

Referring to FIG. 5, instead of a physical storage, the target side includes a virtual storage environment, for example, a target side virtual storage environment 502 which, in one example, mirrors the virtual storage environment 302. In this configuration, the target side host 116 is removed and replaced by a virtual machine 512. The DPA 124 is replaced with a DPA 124' which may either run as a virtual or physical machine. The target side data protection agent 164 is removed from the host 116 and replaced by a data protection agent 164' at the storage array 508. In other examples, the data protection agent 164' is placed at a virtual server 506 and, in this example, the data protection agent 164' may run in a hypervisor kernel or in a virtual machine exposing a virtualization layer.

The target side virtual storage environment 502 includes the data protection agent 164', the virtual server 506 and the storage array 508.

The virtual server 506 includes a virtual machine 512, which includes a virtual device 516. In one example, the virtual server 506 is a VMWARE® ESX® server.

The storage array 508 includes the journal 176' similar to the journal 176, a virtual volume API (Application Program Interface) provider 510, a protocol endpoint 522, a data virtual volume 524, a metadata virtual volume 526, and a key-value pair database for each virtual volume (e.g., a key-value pair database 536 for the metadata virtual volume 526 and a key-value pair database 538 for the data virtual volume 524). The virtual volume API provider 510 includes a data protection API agent 550. In one example, the virtual volume API provider 510 is a VMWARE® vSphere Storage APIs-Storage Awareness (VASA).

Figure 6:
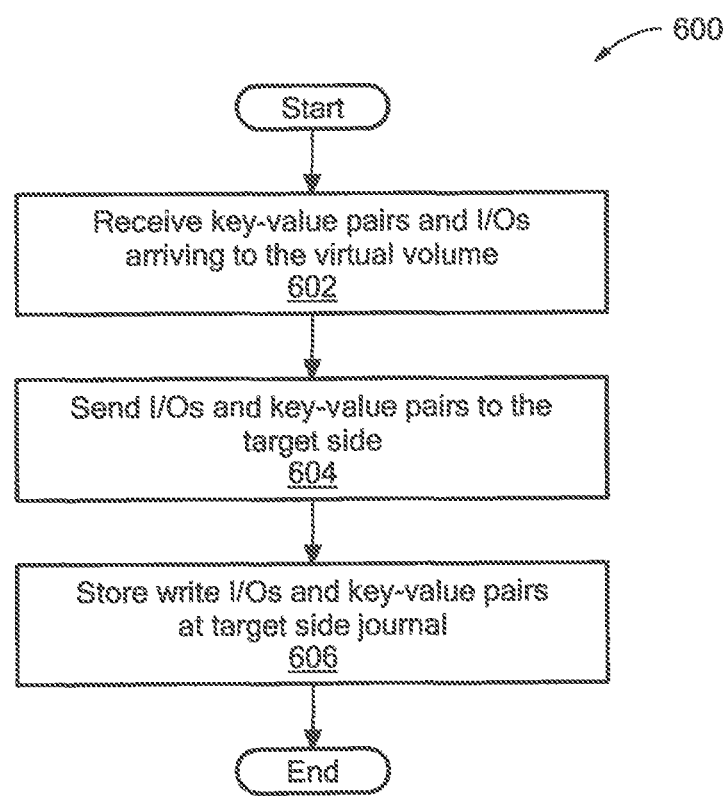
FIG. 6 is a flowchart of an example of a process to replicate updated key-value pairs.

Referring to FIG. 6, an example of a process to replicate updated key-value pairs is a process 600. Process 600 receives key-value pairs and I/Os arriving to the virtual volume (602). For example, the DPA 112' on the source side receives key-value pair updates as well as I/Os arriving to the virtual volumes (e.g., the metadata virtual volume 326 and the data virtual volume 324).

Process 600 sends I/Os and updated key-value pairs to the target side (604). For example, the DPA 112' sends I/Os and updated key-value pairs to the target side for replication.

Process 600 stores write I/Os and key-value pairs at the target side journal (606). For example, the target side DPA 124' stores in a DO Stream of the journal 176' writes arriving to the replicated virtual volumes. The DO METADATA stream will have an offset, length and volume ID of the data for the writes. The DO METADATA stream will include the data for the key/value pairs, the DO METADATA stream will include the information about the key, the new value of the key and the virtual volume for which the key was created. Thus, there is an ordering inside the journal between writes generated by the virtual machines and intercepted by data protection agent 144' and keys intercepted by data protection API agent 350.

Figure 7:
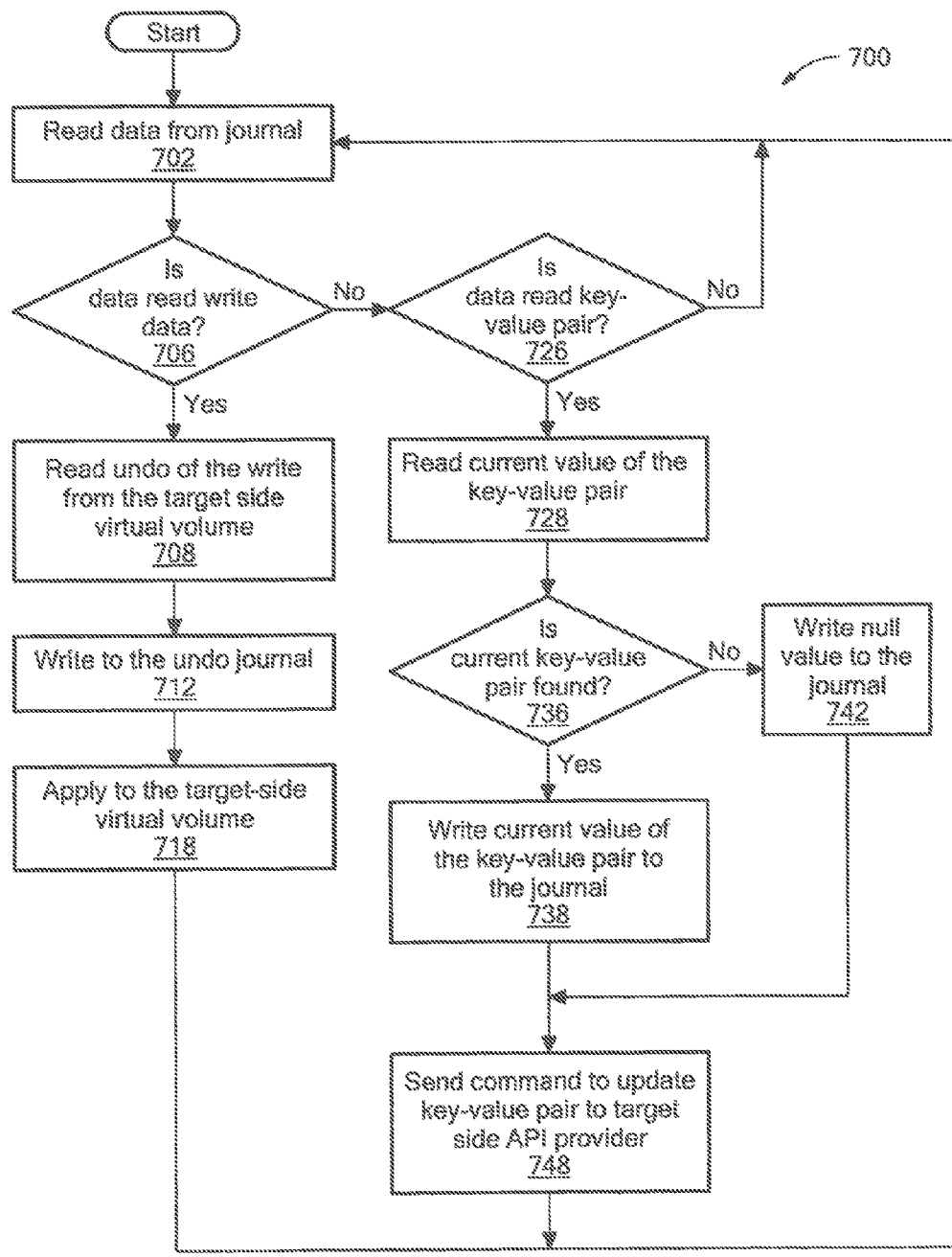
FIG. 7 is a flowchart of an example of a process to apply key-value pairs to a target side storage to allow roll back.

Referring to FIG. 7, an example of a process to apply key-value pairs to the target side virtual volumes to allow rollback is a process 700. Process 700 is applied continuously to data from the DO stream to the replicated (target side) virtual volumes.

Process 700 reads from the journal 176'. For example, data is read from the DO stream and the DO METADATA stream of the journal 176'. Process 700 determines if the data read is a write data (706).

If the data is for a write request, process 700 reads undo data of the write from the target side virtual volume (708). Process 700 writes the undo data read to the journal 176' (712). For example, the undo of the write is written to the UNDO stream before applying the new data to the replicated virtual volume on the target side.

Process 700 applies the write data to the virtual volume of the target side (718). If the data is not for a write, process 700 determines if the data is a key-value pair update (726). If the data is for a key-value pair, process 700 reads a current value of the key-value pair from the API provider 510 (728).

Process 700 determines if the current key-value pair is found (736). If the current key-value pair is found, process 700 writes the current key-value pair to the journal 176' (e.g., UNDO METADATA stream) (738). If the current key-value pair is not found, process 700 writes a null value to the journal (742). After process 700 writes to the journal in processing blocks 738 or 742, the DPA sends the command to update the key-value pair to the target side API provider 510 (748).

In some examples, the DO stream and the DO METADATA stream may be separate streams, but in other embodiments, both streams may be interleaved within one stream.

Figure 8:
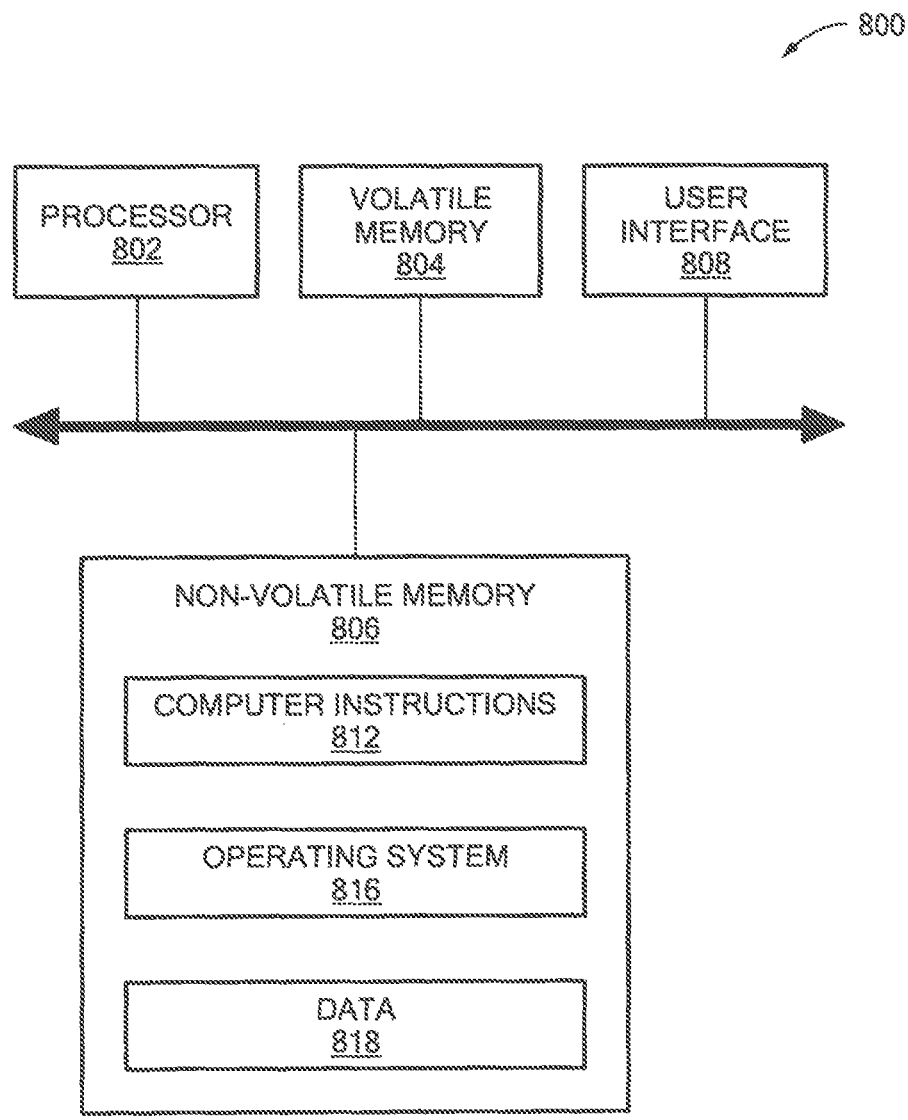
FIG. 8 is a computer on which any of the processes of FIGS. 4, 6 and 7 may be implemented.

Referring to FIG. 8, a computer 800 includes a processor 802, a volatile memory 804, a non-volatile memory 806 (e.g., hard disk) and a user interface (UI) 808 (e.g., a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., processes 400, 600, 700).

The processes described herein (e.g., processes 400, 600, 700) are not limited to use with the hardware and software of FIG. 8; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 400, 600, 700 are not limited to the specific processing order of FIGS. 4, 6 and 7, respectively. Rather, any of the processing blocks of FIGS. 4, 6 and 7 may be re-ordered, combined or removed, performed in parallel or in serial, as necessary, to achieve the results set forth above.

The processing blocks (for example, in the processes 400, 600, 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to replicate a key-value pair, comprising:
   intercepting a command to update a key-value pair in a key-value pair database, the key-value database comprising metadata of a virtual volume;
   sending an updated key-value pair to a data protection appliance;
   receiving an acknowledgement that the data protection appliance received the updated key-value pair;
   updating the key-value pair in the key-value database after the acknowledgement is received;
   receiving key-value pairs and inputs/outputs (I/Os) arriving to the virtual volume;
   sending the I/Os and the key-value pairs to a target side for replication;
   storing the I/Os and the key-value pairs at a journal on the target side;
   reading data from the journal; and
   determining if the data read is write data,
   if the data read is not write data:
      determining if the data read is a value-key pair;
      reading a current value of the key-value pair if the data read is a key-value pair;
      writing the current value of the key-value pair to the journal;
      sending a command to a virtual volume Application Program Interface (API) provider to update key-value pair; and
      writing a null value if the current value of the key-value cannot be read.

2. The method of claim 1, further comprising, if the data read is write data:
   reading undo data of the write from a target side virtual volume, the target side virtual volume being a replication of the virtual volume;
   writing the undo data read to the journal; and
   applying the write data to the target side virtual volume.

3. The method of claim 1, wherein sending an updated key-value pair to a data protection appliance comprises sending an updated key-value pair to a data protection appliance running either in a virtual machine or as set of processes in the storage array.

4. An article comprising:
   a non-transitory machine-readable medium that stores executable instructions, the instructions causing a machine to:
   intercept a command to update a key-value pair in a key-value pair database, the key-value database comprising metadata of a virtual volume;
   send an updated key-value pair to a data protection appliance;
   receive an acknowledgement that the data protection appliance received the updated key-value pair;
   update the key-value pair in the key-value database after the acknowledgement is received;
   receive key-value pairs and inputs/outputs (I/Os) arriving to the virtual volume;
   send the I/Os and the key-value pairs to a target side for replication;
   store the I/Os and the key-value pairs at a journal on the target side;
   read data from the journal; and
   determine if the data read is write data. if the data read is not write data:
      determine if the data read is a value-key pair;
      read a current value of the key-value pair if the data read is a key-value pair;
      write the current value of the key-value pair to the journal;
      send a command to a virtual volume Application Program Interface (API) provider to update key-value pair; and
      write a null value if the current value of the key-value cannot be read.

5. The article of claim 4, further comprising instructions causing the machine to, if the data read is write data:
   read undo data of the write from a target side virtual volume, the target side virtual volume being a replication of the virtual volume;
   write the undo data read to the journal; and
   apply the write data to the target side virtual volume.

6. The article of claim 4, wherein the instructions causing the machine to send an updated key-value pair to a data protection appliance comprises instructions causing the machine to send an updated key-value pair to a data protection appliance running either in a virtual machine or as set of processes in the storage array.

7. An apparatus, comprising:
   circuitry configured to:
   intercept a command to update a key-value pair in a key-value pair database, the key-value database comprising metadata of a virtual volume;
   send an updated key-value pair to a data protection appliance;
   receive an acknowledgement that the data protection appliance received the updated key-value pair; and
   update the key-value pair in the key-value database after the acknowledgement is received;
   receive key-value pairs and I/Os arriving to the virtual volume;
   send the I/Os and the key-value pairs to a target side for replication;
   store the I/Os and the key-value pairs at a journal on the target side;
   read data from the journal; and
   determine if the data read is write data:
      if the data read is not write data: determine if the data read is a value-key pair;
      read a current value of the key-value pair if the data read is a key-value write the current value of the key-value pair to the journal;
      send a command to a virtual volume API provider to update key-value pair; and
      write a null value if the current value of the key-value cannot be read.

8. The apparatus of claim 7 wherein the circuitry comprises at least one of a processor, a memory, programmable logic and logic gates.

9. The apparatus of claim 7 wherein the circuitry is further configured to, if the data read is write data:
   read undo data of the write from a target side virtual volume, the target side virtual volume being a replication of the virtual volume;
   write the undo data read to the journal; and
   apply the write data to the target side virtual volume.

10. The apparatus of claim 7 wherein the circuitry configured to send an updated key-value pair to a data protection appliance comprises circuitry configured to send an updated key-value pair to a data protection appliance running either in a virtual machine or as set of processes in the storage array.

* * * * *